(12) United States Patent
Huang

(10) Patent No.: US 7,775,097 B1
(45) Date of Patent: Aug. 17, 2010

(54) TIRE PRESSURE DETECTOR

(75) Inventor: Wen-Huo Huang, Hsinchu County (TW)

(73) Assignee: Sung Jung Minute Industry Co., Ltd., Hsinchu County (TW)

( * ) Notice: Subject to any disclaimer, the term of this patent is extended or adjusted under 35 U.S.C. 154(b) by 0 days.

(21) Appl. No.: 12/411,987

(22) Filed: Mar. 26, 2009

(51) Int. Cl.
*B60C 23/02* (2006.01)
(52) U.S. Cl. .................................................. 73/146.3
(58) Field of Classification Search ........ 73/146–146.8; 340/442, 145
See application file for complete search history.

(56) References Cited

U.S. PATENT DOCUMENTS 7,458,256 B1 * 12/2008 Lin ........................... 73/146.8
7,509,969 B2 * 3/2009 Huang ....................... 137/226
7,607,346 B1 * 10/2009 Oboza et al. ............... 73/146.8

FOREIGN PATENT DOCUMENTS

TW M315663 7/2007

* cited by examiner

*Primary Examiner*—Jewel Thompson
(74) *Attorney, Agent, or Firm*—Muncy, Geissler, Olds & Lowe, PLLC

(57) ABSTRACT

A tire pressure detector, which is installed on an air tap of a wheel to detect the tire pressure, comprises an air-intake device, a bidirectional sleeve and a cap. The air-intake device includes an air-intake seat. The air-intake seat has an air-intake member and an engagement member. The air-intake seat is installed on the air tap via the air-intake member. The bidirectional sleeve has a first connection member and a second connection member, which are respectively formed on two sides of a separating member. The first connection member engages with the engagement member of the air-intake seat to form an air chamber accommodating a detection device detecting the tire pressure. The cap has a connection wall, which cooperates with the second connection member to form an accommodation space receiving a power source powering the detection device.

19 Claims, 9 Drawing Sheets

TIRE PRESSURE DETECTOR

FIELD OF THE INVENTION

The present invention relates to a tire pressure detector, particularly to a tire pressure detector for vehicle wheels.

BACKGROUND OF THE INVENTION

Driving safety is the most important matter for drivers, and tires play a significant role in driving safety. The tire of a wheel should have an appropriate pressure. Too high a tire pressure or too low a tire pressure affects driving safety. However, the driver cannot learn the tire pressure from the appearance thereof but can only rely on the equipment and personnel of a vehicle repair shop. Needless to say, the driver cannot monitor the tire pressure in a running vehicle. Therefore, the related manufacturers have developed various tire pressure detectors to monitor the tire pressure.

A R.O.C. patent No. M315663 disclosed a "Detective Air Tap Cap Assembly", which comprises a casing, a cap, a power supply device, and a detective circuit board. The cap is embedded in on side of the casing, and the detective circuit board is press-fitted to the interior of the casing. The cap has batteries supplying power to the detective circuit board. The detective air tap is fastened to the air tap of a tire, and the air in the tire enters the casing via an air inlet. The detective circuit board detects the status of the tire. A control unit analyzes the information and wirelessly transmits the signals to a receiving device. Then, the driver learns the status of the tire from the receiving device. However, the prior-art patent does not have an air chamber but uses a valve core needle to press against the valve core of the air tap to control the air flowing from the tire to the tire pressure detection device. Such a means may result in air leakage. On the other hand, the cap, which is embedded in the casing, uses a washer to prevent from the air leakage of the tire pressure detection device. However, such an approach has only a limited effect on preventing from the air leakage in the engagement region of the cap and the casing. As the prior-art patent does not have an air chamber, there is usually difference between the detection result and the actual status. Thus, the driver may receive wrong information, and driving safety may be affected. Further, the batteries are installed inside the cap. However, the cap is embedded in the casing and unlikely to be dismantled from the casing. Thus, the exhausted batteries cannot be replaced. In other words, the entire service life of the detection device is equal to the service life of the batteries. For consumers, such a limited service life means a poor economic efficiency.

In the prior-art tire pressure detection device, airtightness is inferior, batteries are hard to replace, economic efficiency is low, detection results are apt to be inaccurate, and air leakage is likely to occur after a long time use.

SUMMARY OF THE INVENTION

The primary objectives of the present invention are to improve the poor airtightness of the conventional tire pressure detectors, keep the airtightness of the tire pressure detector during replacing batteries, guarantee detection accuracy, and prevent from the air leakage caused by using the tire pressure detector.

To achieve the abovementioned objectives, the present invention proposes a tire pressure detector, which is installed on an air tap of a wheel to detect the tire pressure, and which comprises an air-intake device, a bidirectional sleeve and a cap. The air-intake device includes an air-intake seat. The air-intake seat has an air-intake member and an engagement member on the other side of the air-intake member. The air-intake seat is installed on the air tap via the air-intake member. The bidirectional sleeve has a separating member, a first connection member and a second connection member, and the first connection member and the second connection member are respectively formed on two sides of the separating member. The first connection member connects with the engagement member of the air-intake seat to form an air chamber accommodating a detection device detecting the tire pressure. The cap has a connection wall, which cooperates with the second connection member to form an accommodation space receiving a power source powering the detection device.

In one embodiment of the present invention, the air-intake member has an air-intake force-action member where an air-intake locking instrument applies force. The air-intake locking instrument has a first positioning member matching the air-intake force-action member. The air-intake device also has a theft-proof element. The theft-proof element has at least one theft-proof force-action member where a theft-proof locking instrument applies force. The theft-proof locking instrument has a second positioning member matching the theft-proof force-action member. Thus, the present invention can effectively prevent from theft.

In another embodiment, the present invention further comprises a dedicated air tap protruding from a tire. The tire pressure detector is installed on the dedicated air tap via the air-intake member of the air-intake seat. The dedicated air tap includes an air tube and an air-intake tip which are formed in an integral manner. The air-intake tip is connected to a tire, and the air tube protrudes from the tire. Thus, the user needn't dismount the tire pressure detector from the dedicated air tap before tire inflation. Besides, the dedicated air tap is arranged on the lower side of the chassis. Such an arrangement will not affect the appearance of the wheel but can effectively reduce the theft rate of the tire pressure detector.

In comparison with the conventional technology, the present invention detects the tire pressure in a fully airtight air chamber. Therefore, the present invention can obtain accurate tire pressure data. In the present invention, the battery can be directly replaced without affecting detection accuracy. In the present invention, the user can conveniently inflate the tire without dismounting the tire pressure detector from the dedicated air tap. Further, the present invention has a theft-proof function. Furthermore, the present invention can keep the original appearance of the wheel.

DETAILED DESCRIPTION OF THE PREFERRED EMBODIMENTS

Figure 1:
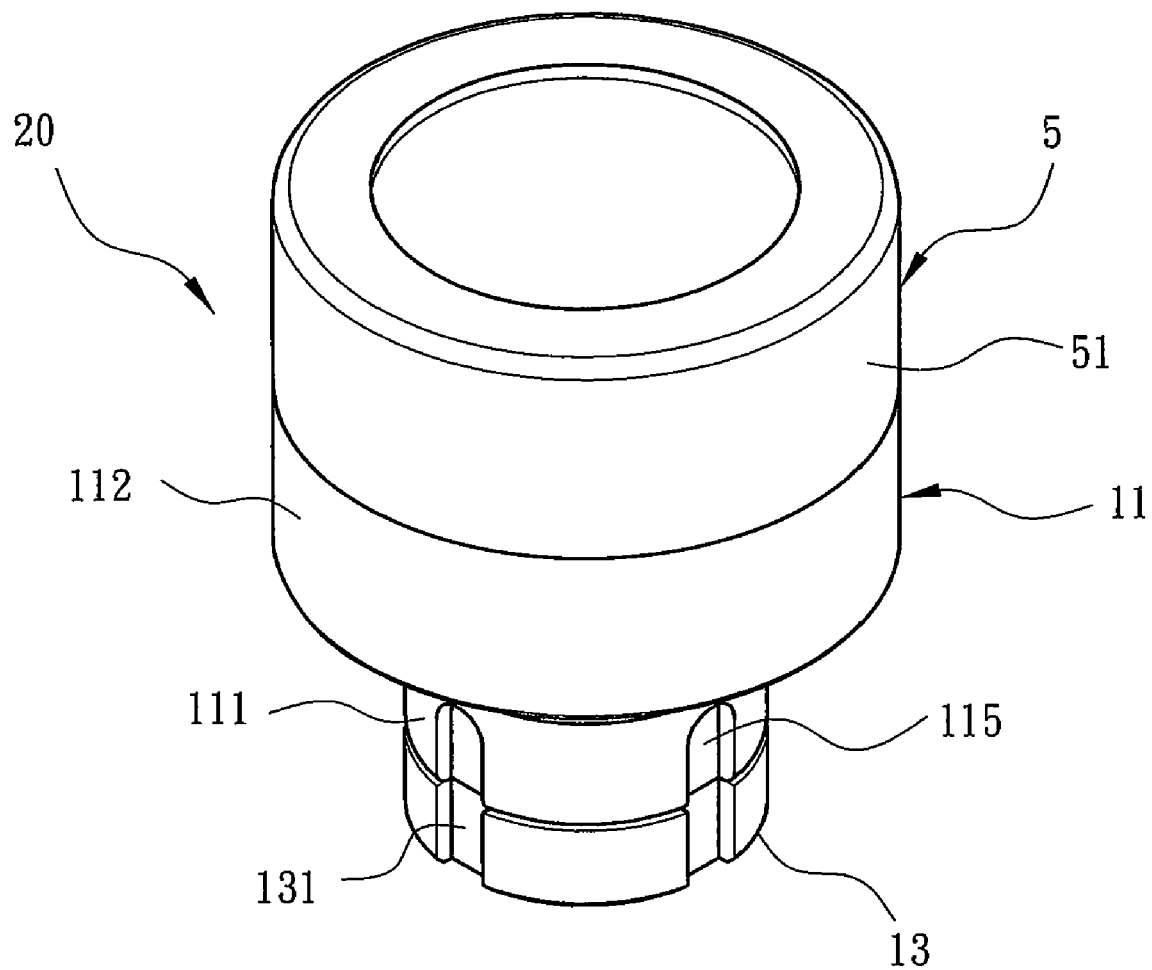
FIG. 1 is a perspective view schematically showing a tire pressure detector according to a first embodiment of the present invention.
Figure 2:
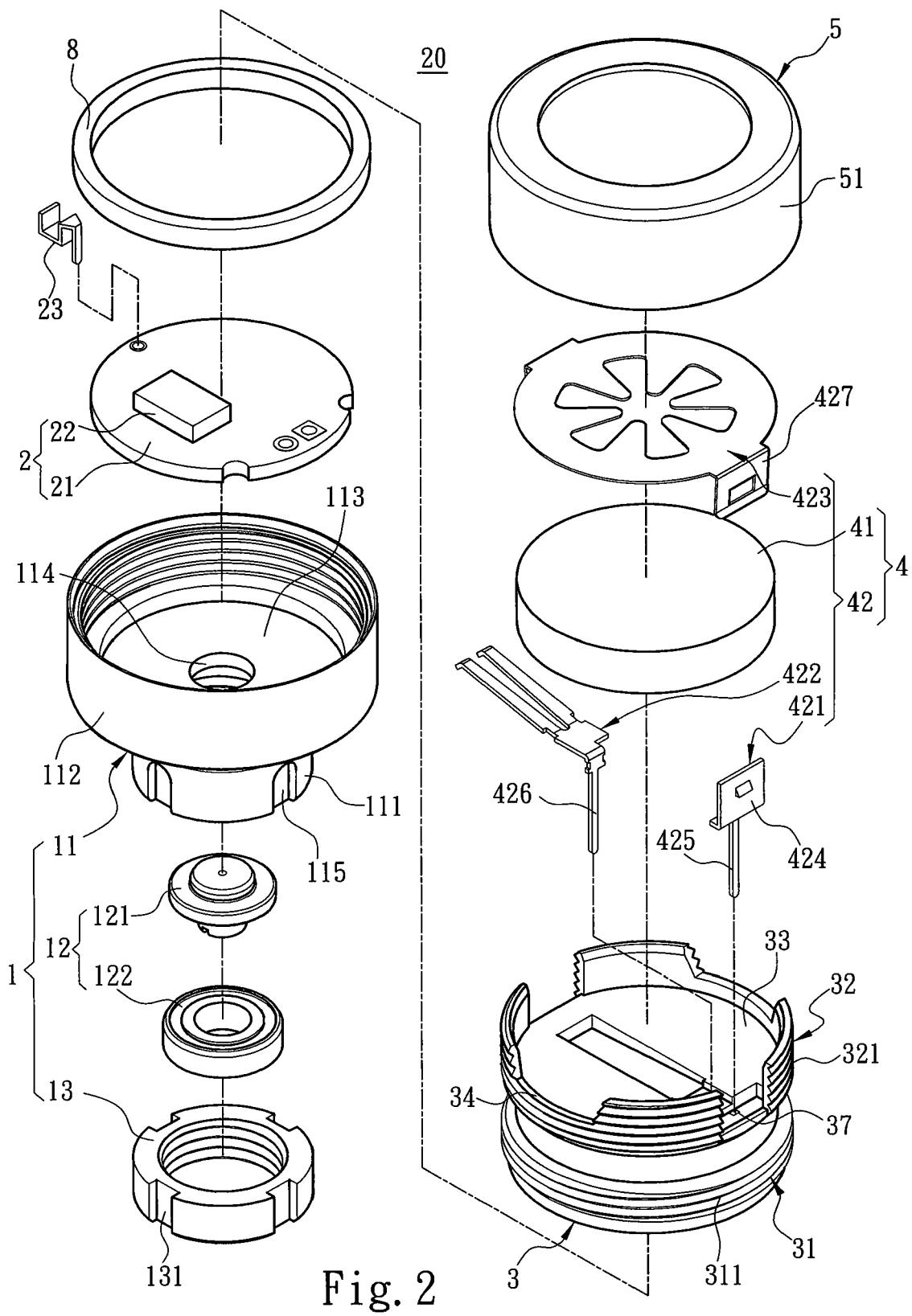
FIG. 2 is an exploded view schematically showing a tire pressure detector according to the first embodiment of the present invention.
Figure 3:
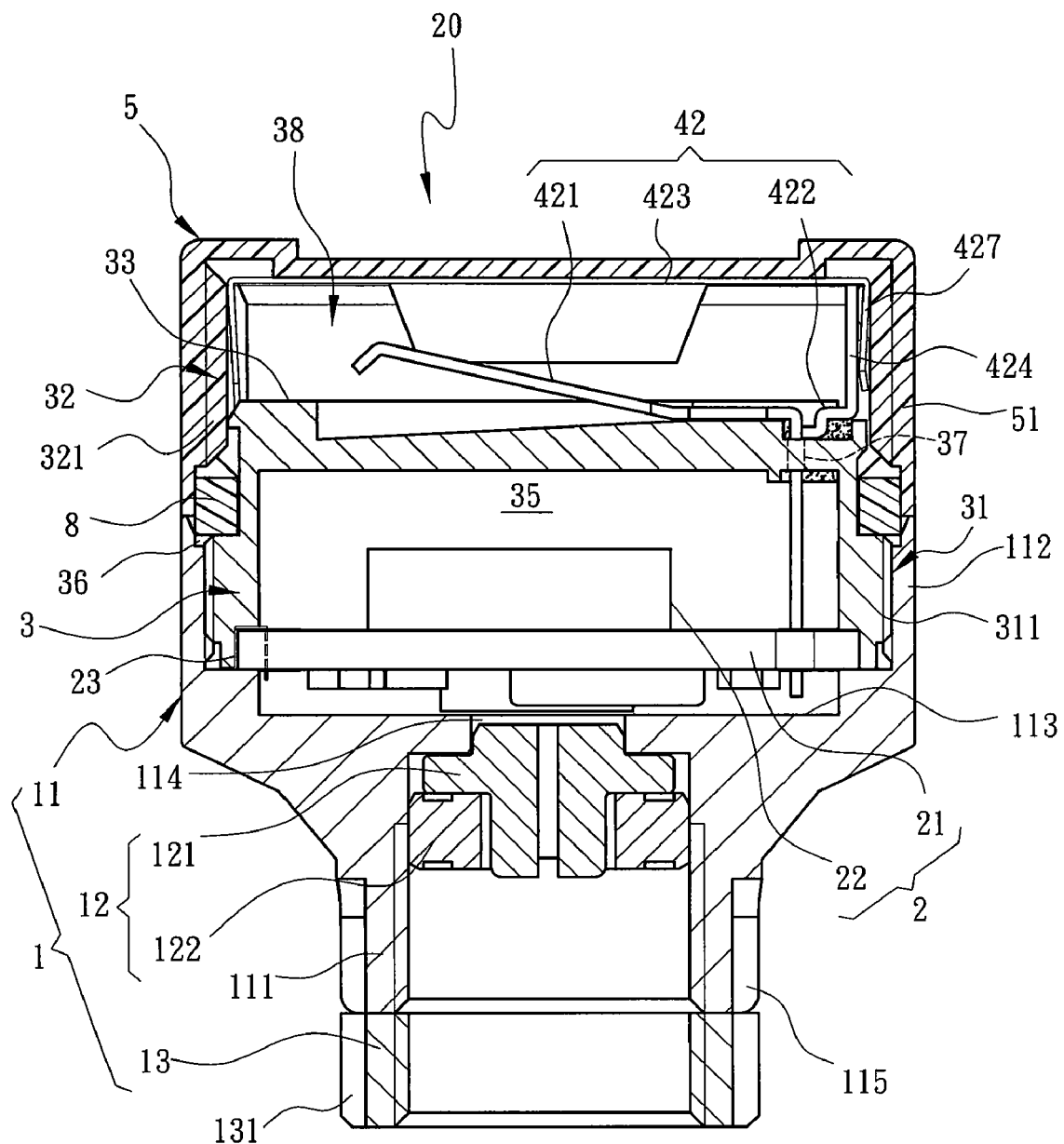
FIG. 3 is a sectional view schematically showing a tire pressure detector according to the first embodiment of the present invention (the battery is not shown in the drawing)
Figure 4:
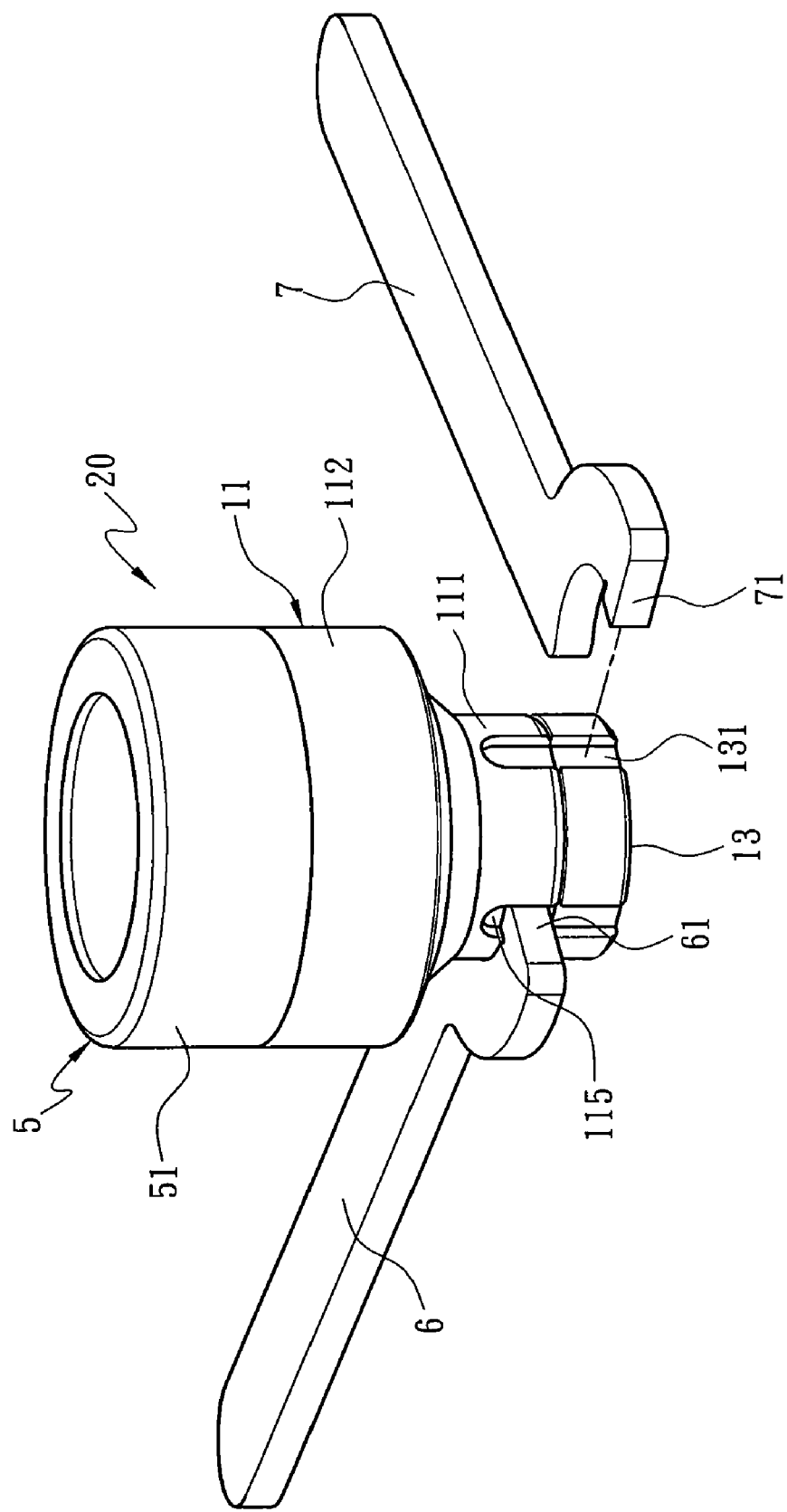
FIG. 4 is a diagram schematically showing that dedicated instruments are used to install a tire pressure detector according to the present invention.

Below, the technical contents of the present invention are described in detail in cooperation with the drawings.

Refer to FIGS. 1-4 respectively a perspective view, an exploded view, a sectional view, and a diagram schematically showing a tire pressure detector according to a first embodiment of the present invention. The present invention proposes a tire pressure detector 20, which is installed on an air tap 10 of a wheel to detect the tire pressure, and which comprises an air-intake device 1, a detection device 2, a bidirectional sleeve 3, a power source 4 and a cap 5.

The air-intake device 1 includes an air-intake seat 11 and a theft-proof element 13, wherein the air-intake seat 11 and the theft-proof element 13 are made of a metal material. The air-intake seat 11 has an air-intake member 111 and an engagement member 112. A horizontal separator 113 is formed between the air-intake member 111 and the engagement member 112. The horizontal separator 113 has a valve hole 114 interconnecting the air-intake member 111 and the engagement member 112. A valve device 12 props the valve hole 114 against the air tap 10. The valve device 12 includes a valve mouth 121 and a valve ring 122. The valve mouth 121 pushes the air tap 10 to allow the air inside the tire to enter the air-intake device 1. The air-intake seat 11 is installed on the air tap 10 via the thread of the air-intake member 111. On the other side of the thread of the air-intake member 111 is formed at least one air-intake force-action member 115 where an air-intake locking instrument 6 applies force. The air-intake locking instrument 6 has a first positioning member 61 matching the air-intake force-action member 115. The theft-proof element 13 has a thread, whereby the theft-proof element 13 can be screwed to engage with the air tap 10. On the other side of the thread of the theft-proof element 13 is formed at least one theft-proof force-action member 131 where a theft-proof locking instrument 7 applies force. The theft-proof locking instrument 7 has a second positioning member 71 matching the theft-proof force-action member 131. In the practical application, the theft-proof element 13 is screwed to engage with the air tap 10 firstly, and then the air-intake seat 11 is screwed to engage with the air tap 10. When the air-intake seat 11 and the theft-proof element 13 are both screwed to the terminal of the air tap 10, the first positioning member 61 of the air-intake locking instrument 6 and the second positioning member 71 of the theft-proof locking instrument 7 are moved to respectively engage with the air-intake force-action member 115 and the theft-proof force-action member 131. Then, the air-intake locking instrument 6 applies a clockwise force to the air-intake force-action member 115, and the theft-proof locking instrument 7 applies a counterclockwise force to the theft-proof force-action member 131, whereby the air-intake seat 11 presses against the theft-proof element 13 tightly. As the air-intake locking instrument 6 and the theft-proof locking instrument 7 are dedicated instruments, the thief without the dedicated instruments is unable to dismount the tire pressure detector 20 without damage. If the thief uses a non-dedicated instrument or even uses a violent force to dismount the tire pressure detector 20, the tire pressure detector 20 will be damaged. Thus is achieved an anti-theft effect.

The detection device 2 includes a printed circuit board 21. The detection device 2 also includes at least one detection element 22 on the printed circuit board 21, a wireless transmission conductor 23 and related electronic elements, which are all electrically connected to the printed circuit board 21. The wireless transmission conductor 23 penetrates the printed circuit board 21 to contact the air-intake seat 11, whereby the metallic air-intake seat 11 can function as an antenna of wireless transmission. Thus, the tire pressure data detected by the detection device 2 is wirelessly transmitted to a receiving device. The receiving device may be installed inside the front vehicle and on a position where the driver can conveniently monitor. Alternatively, the receiving device is incorporated with the vehicle computer, and the tire pressure data is then presented on the dashboard.

In the bidirectional sleeve 3, a first connection member 31 and a second connection member 32 are respectively formed on two sides of a separating member 33, wherein the separating member 33 extends from the lateral edge vertically toward two opposite ends to form the annular wall-like first connection member 31 and second connection member 32. The first connection member 31 has a thread 311 mating with the thread of the air-intake seat 11. The first connection member 31 engages with the engagement member 112 of the air-intake seat 11 to form an air chamber 35. The separating member 33 has at least one through-hole 37. An adhesive 36 is applied to the junction of the first connection member 31 and the engagement member 112 of the air-intake seat 11 to guarantee the airtightness of the air chamber 35. The adhesive 36 is the glue suitable to metallic materials and plastic materials, such as epoxy resin. The second connection member 32 has a thread 321 mating with the thread of the cap 5. The second connection member 32 also has at least one notch 34. A sleeve ring 8 is arranged at the lateral edge of the separating member 33 and between the thread 311 of the first connection member 31 and the thread 321 of the second connection member 32.

The power source 4 has a battery 41 and at least one conduction element 42. The conduction element 42 has a positive conductor 421, a negative conductor 422, and a movable pressing conductor 423. The movable pressing conductor 423 has at least one fixing end 427 coupled to a contact end 424 of the positive conductor 421. The fixing end 427 has a press-fit slot, and the contact end 424 has a press-fit hook, and the press-fit hook can be press-fitted to the press-fit slot. The positive conductor 421 and the negative conductor 422 respectively have conduction rods 425 and 426. The positive conductor 421 and the negative conductor 422 are installed in the bidirectional sleeve 3. The conduction rods 425 and 426 extend from the second connection member 32 of the bidirectional sleeve 3, penetrate the through-hole 37, and reach the air chamber 35 inside the first connection member 31.

The cap 5 has a connection wall 51, which cooperates with the second connection member 32 to form an accommodation space 38 receiving the power source 4. The conduction rod 425 of the positive conductor 421 and the conduction rod 426 of the negative conductor 422 extend from the accommodation space 38, penetrate the through-hole 37 of the separating member 33, and reach the air chamber 35 to electrically connect with the printed circuit board 21, whereby the power source 4 electrically connects to the detection device 2 and powers the tire pressure detector 20. After the conduction rods 425 and 426 have penetrated the through-hole 37, the adhesive 36 is used to respectively seal the through-hole 37 from the sides of the accommodation space 38 and the air chamber 35 to guarantee the airtightness of the air chamber 35 and keep the high-pressure air of the tire completely enclosed in the air chamber 35.

Figure 5A:
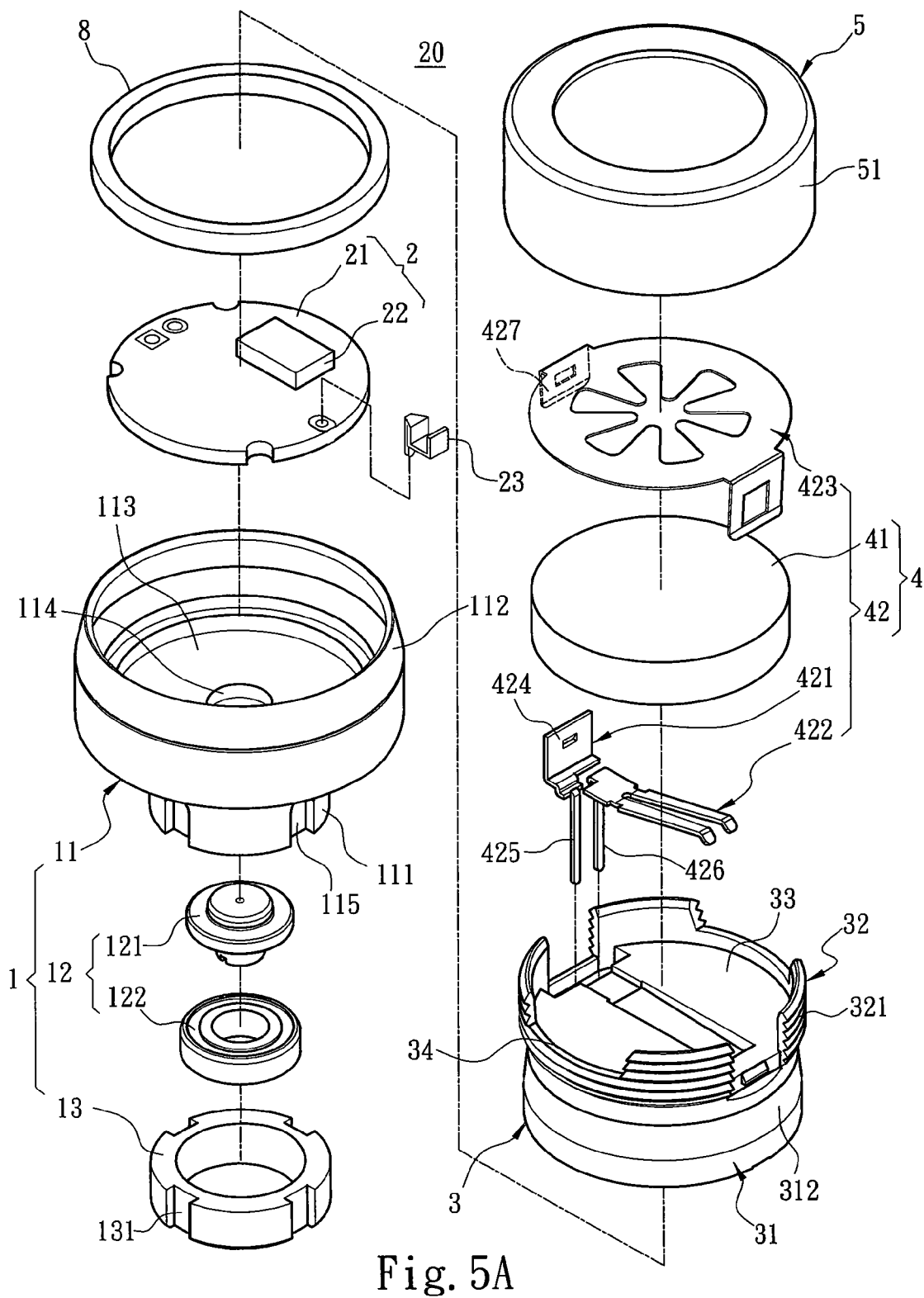
FIG. 5A is an exploded view schematically showing a tire pressure detector according to a second embodiment of the present invention.
Figure 5B:
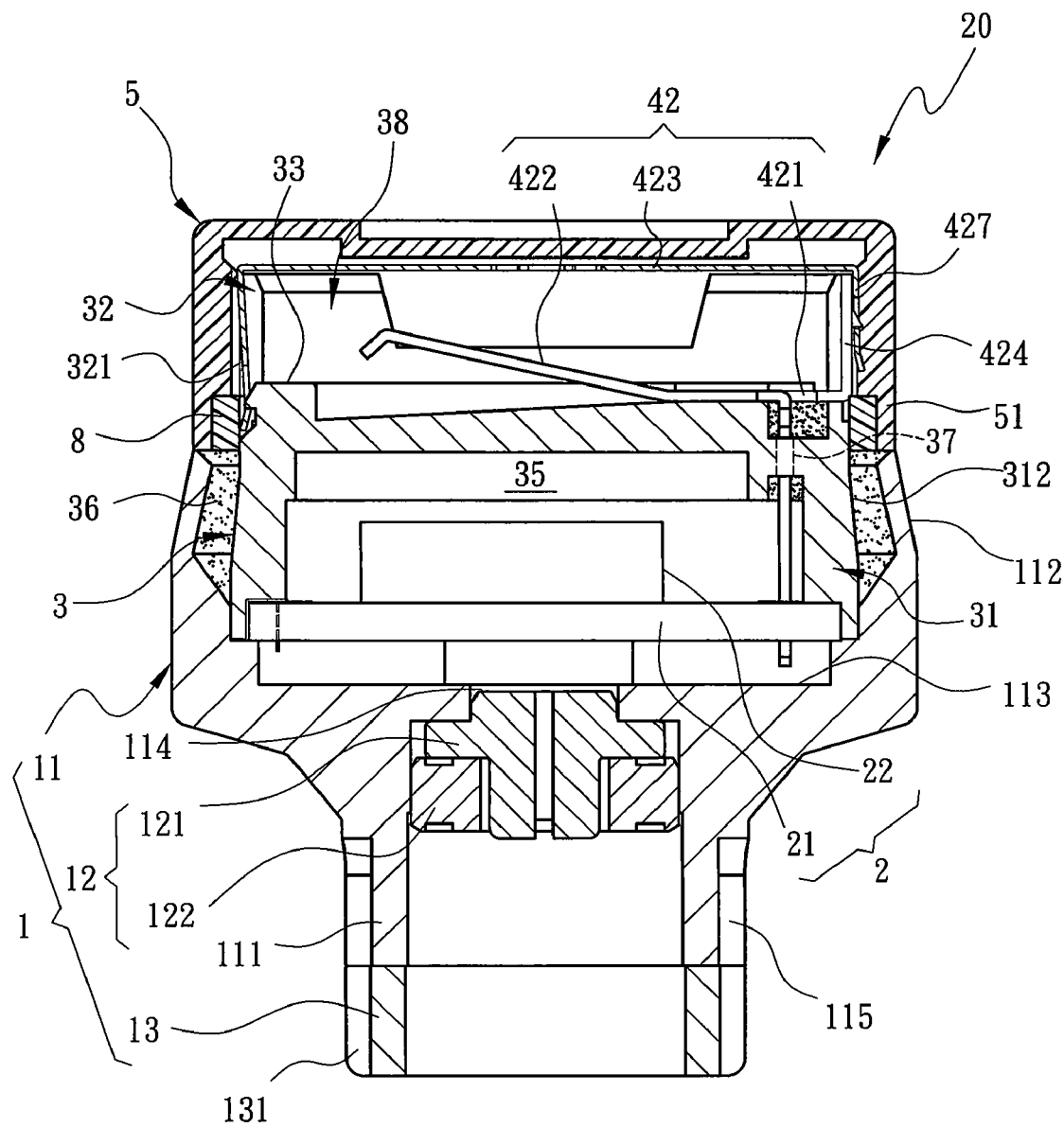
FIG. 5B is a sectional view schematically showing a tire pressure detector according to the second embodiment of the present invention.
Figure 6A:
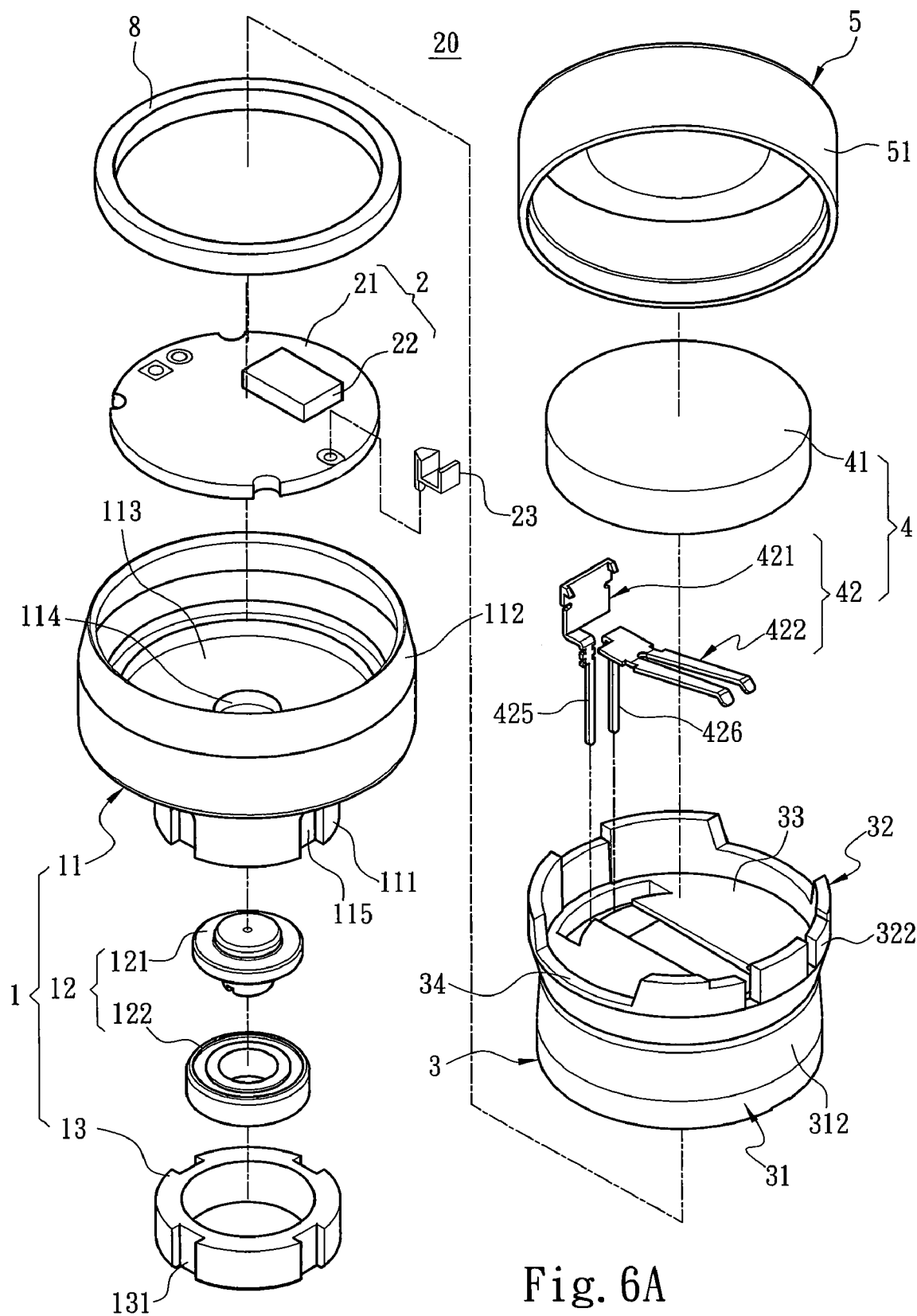
FIG. 6A is an exploded view schematically showing a tire pressure detector according to a third embodiment of the present invention.
Figure 6B:
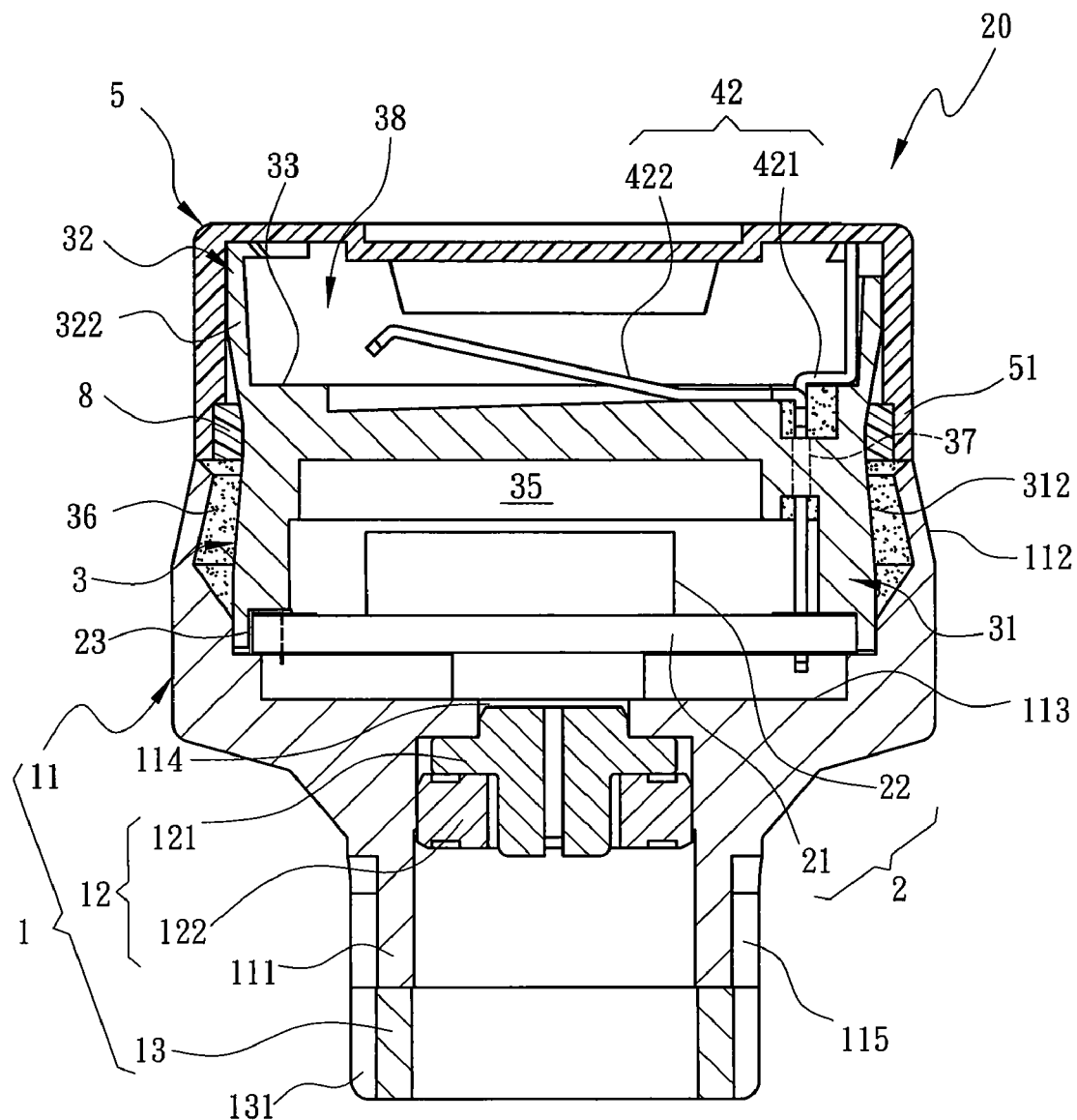
FIG. 6B is a sectional view schematically showing a tire pressure detector according to the third embodiment of the present invention.

Refer to FIG. 5A and FIG. 5B for a second embodiment of the present invention. Refer to FIG. 6A and FIG. 6B for a third embodiment of the present invention. The structures and principles of the second and third embodiments are basically similar to those of FIG. 2. In FIG. 5A and FIG. 5B, the first connection member 31 of the bidirectional sleeve 3 has an inclined face 312 used to press-fit to the engagement member 112 of the air-intake seat 11. The adhesive 36 is used to seal the gap in the junction of the bidirectional sleeve 3 and the air-intake seat 11. In FIG. 6A and FIG. 6B, the second connection member 32 of the bidirectional sleeve 3 has an inclined face 322 used to press-fit to the connection wall 51 of the cap 5. The positive conductor 421 in FIG. 6A and FIG. 6B directly contacts the positive of the battery 41 and thus is slightly different from the positive conductor 421 in FIG. 2. Therefore, the conduction element 42 of the power source 4 needs only the positive conductor 421 and the negative conductor 422 to transmit power to the battery 41 in FIG. 6A and FIG. 6B. Besides, the notches 34 of the second connection member 32 can convenience the user to replace the battery 41. From FIG. 5A and FIG. 6A, it is known that the first connection member 31 of the bidirectional sleeve 3 is not limited to have a thread 311 or an inclined face 312, and that the second connection member 32 of the bidirectional sleeve 3 is not limited to have a thread 321 or an inclined face 322, in the present invention. In the present invention, the first connection member 31 and the second connection member 32 may respectively have other structures to engage with the corresponding components. Further, the present invention does not limit the first connection member 31 and the second connection member 32 to have the same type of structures. Nevertheless, the junction of the first connection member 31 and the air-intake seat 11 always have to be sealed with the adhesive 36 to guarantee airtightness, in the present invention.

Figure 7:
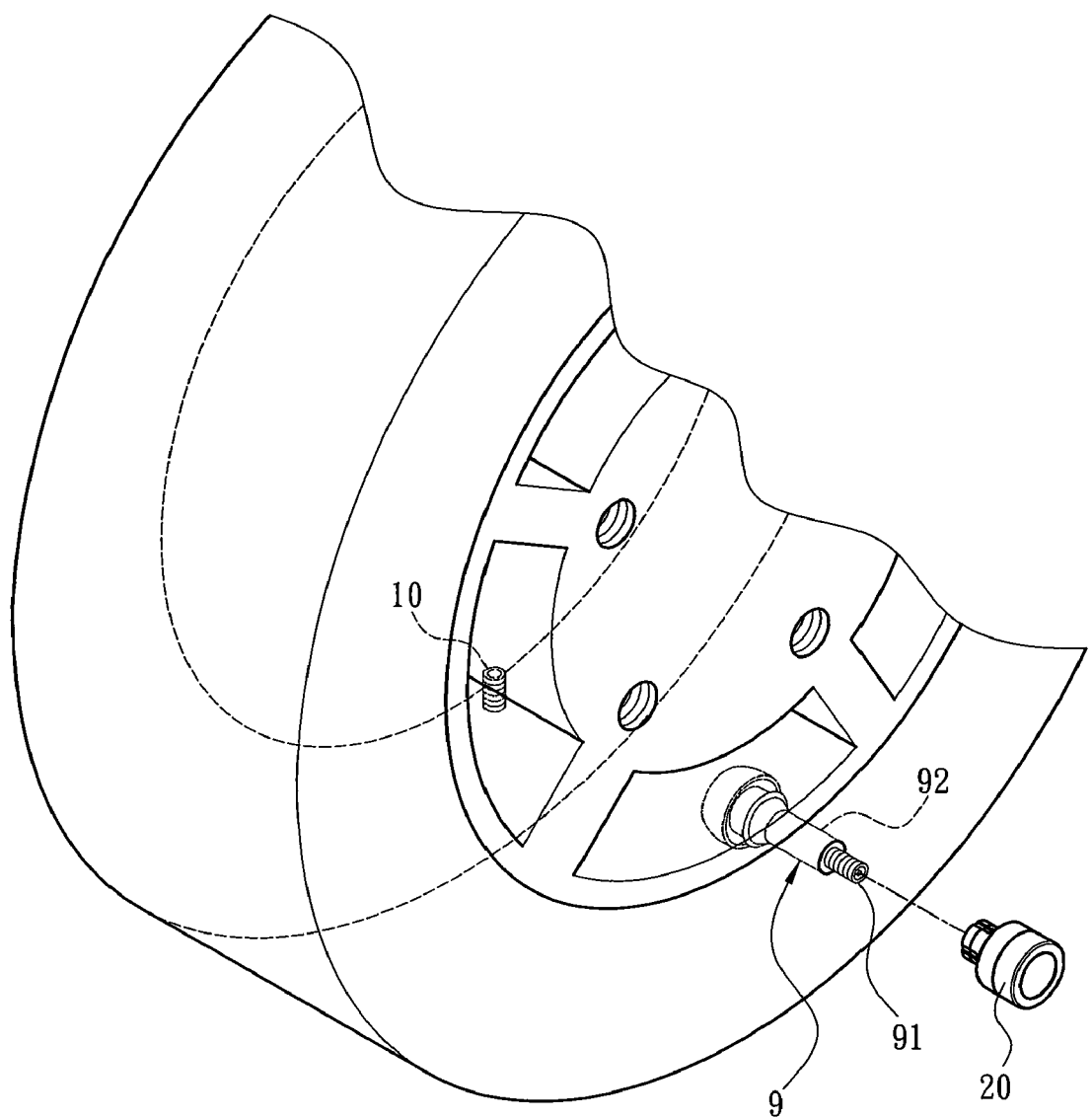
FIG. 7 is a diagram schematically showing that the present invention is installed on a dedicated air tap according to the present invention.

In the conventional technology, the tire pressure detector is installed on a common air tap 10, and the user has to dismount the tire pressure detector from the common air tap 10 before tire inflation. Refer to FIG. 7 a diagram schematically showing that the present invention is installed on a dedicated air tap 9. As shown in FIG. 7, the tire pressure detector 20 can be installed on a common air tap 10 or a dedicated air tap 9. The dedicated air tap 9 includes an air tube 91 and an air-intake tip 92 in an integral manner. The air-intake tip 92 is connected to the tire, and the air tube 91 protrudes from the tire to connect with the tire pressure detector 20. The dedicated air tap 9 is arranged on the other side opposite to the common air tap 10, i.e. on the lower side facing the chassis, whereby the user needn't dismount the tire pressure detector 20 from the air tap 10 before tire inflation, and whereby the theft rate of the tire pressure detector 20 can be reduced, and whereby the appearance of the wheel is not affected.

What is claimed is:

1. A tire pressure detector, which is installed on an air tap of a wheel to detect tire pressure, comprising an air-intake device including an air-intake seat, wherein said air-intake seat has an air-intake member and an engagement member on the other side of said air-intake member, and said air-intake seat is mounted on said air tap via said air-intake member;

a bidirectional sleeve including a first connection member, a second connection member and a separating member separating said first connection member and said second connection member, wherein said first connection member is connected with said engagement member of said air-intake seat to form an air chamber accommodating a detection device detecting tire pressure; and a cap including a connection wall cooperating with said second connection member to form an accommodation space receiving a power source powering said detection device.

2. The tire pressure detector according to claim 1, wherein said separating member extends from a lateral edge vertically toward two opposite ends to form said first connection member and said second connection member, which respectively have annular walls; said first connection member has a thread to engage with said air-intake seat; said second connection member has a thread to engage with said cap.

3. The tire pressure detector according to claim 2, wherein said first connection member has an inclined face to press-fit to said air-intake seat; said second connection member has an inclined face to press-fit to said cap.

4. The tire pressure detector according to claim 2, wherein said second connection member has at least one notch.

5. The tire pressure detector according to claim 1, wherein an adhesive is applied to a junction of said first connection member and said engagement member of said air-intake seat.

6. The tire pressure detector according to claim 1, wherein a horizontal separator is formed between said air-intake member and said engagement member; said horizontal separator has a valve hole interconnecting said air-intake member and said engagement member; a valve device props said valve hole against said air tap.

7. The tire pressure detector according to claim 1, wherein a sleeve ring is arranged around said separating member of said bidirectional sleeve and between said first connection member and said second connection member.

8. The tire pressure detector according to claim 1, wherein said separating member has at least one through-hole interconnecting said accommodation space and said air chamber and allowing at least one conduction element of said power source to penetrate said separating member from said second connection member to said air chamber to electrically connect with said detection device.

9. The tire pressure detector according to claim 8, wherein an adhesive is used to seal said through-hole from a side of said accommodation space and a side of said air chamber.

10. The tire pressure detector according to claim 8, wherein said power source includes a battery.

11. The tire pressure detector according to claim 8, wherein said conduction element has a positive conductor, a negative conductor, and a movable pressing conductor; said movable pressing conductor has at least one fixing end coupled to a contact end of said positive conductor.

12. The tire pressure detector according to claim 11, wherein said fixing end has a press-fit slot, and said contact end has a press-fit hook.

13. The tire pressure detector according to claim 1, wherein said air-intake member of said air-intake seat has an air-intake force-action member where an air-intake locking instrument applies force; said air-intake locking instrument has a first positioning member matching said air-intake force-action member.

14. The tire pressure detector according to claim 1, wherein said air-intake device further includes a theft-proof element; said theft-proof element has a theft-proof force-action member where a theft-proof locking instrument applies force.

15. The tire pressure detector according to claim 14, wherein said theft-proof locking instrument has a second positioning member matching said theft-proof force-action member.

16. The tire pressure detector according to claim 1, wherein said detection device includes a printed circuit board, at least one detection element, and related electronic elements.

17. The tire pressure detector according to claim 1, wherein said air tap is arranged on a steel wheel.

18. The tire pressure detector according to claim 1, wherein said air tap is a dedicated air tap on the surface of a tire for tire pressure detection.

19. The tire pressure detector according to claim 18, wherein said dedicated air tap includes an air tube and an air-intake tip in an integral manner; said air-intake tip is connected to said tire, and said air tube protrudes from said tire.

* * * * *